United States Patent

[11] 3,578,901

[72] Inventor Dal F. Griepentrog
Indianapolis, Ind.
[21] Appl. No. 730,335
[22] Filed May 20, 1968
[45] Patented May 18, 1971
[73] Assignee RCA Corporation
[32] Priority Oct. 3, 1967
[33] France
[31] 123—101

[54] VIDEO AMPLIFIER FOR DRIVING A DELAY LINE BETWEEN GROUNDED COLLECTOR AND GROUNDED BASE STAGES
11 Claims, 1 Drawing Fig.

[52] U.S. Cl. .......... 178/5.4R, 178/7.5R, 330/28
[51] Int. Cl. .......... H04n 9/18
[50] Field of Search .......... 178/5.4, 7.3 (E); 330/20, 28

[56] References Cited

UNITED STATES PATENTS

| | | | |
|---|---|---|---|
| 3,165,579 | 1/1965 | Stark, Jr. et al. | 178/5.4 |
| 3,341,665 | 8/1967 | Vilkomerson | 178/7.2 |
| 3,437,947 | 4/1969 | Beekman | 330/20 |
| 3,456,204 | 7/1969 | Moses | 330/28 |
| 3,202,838 | 8/1965 | Ryon, Jr. et al. | 328/55 |

OTHER REFERENCES

TRANSISTOR TELEVISION RECEIVERS T. D. Towers 1963 pp. 59— 60

*Primary Examiner*—Robert L. Griffin
*Assistant Examiner*—Donald E. Stout
*Attorney*—Eugene M. Whitacre

ABSTRACT: Transistorized luminance channel of a color television receiver includes emitter follower coupled to input of luminance delay line and common base amplifier coupled to delay line output. Low output impedance of emitter follower and low input impedance of common base amplifier permits reliable termination of both ends of delay line with resistors substantially matching characteristic impedance of delay line. Common emitter amplifier serves to amplify and invert output of common base amplifier, and inverted signal is applied to power output stage via common collector stage providing a low impedance output circuit. Negative feedback established by path between emitters of common collector and common base amplifiers ensures low source impedance required to adequately drive output stage; feedback path provides convenient facility for frequency response control.

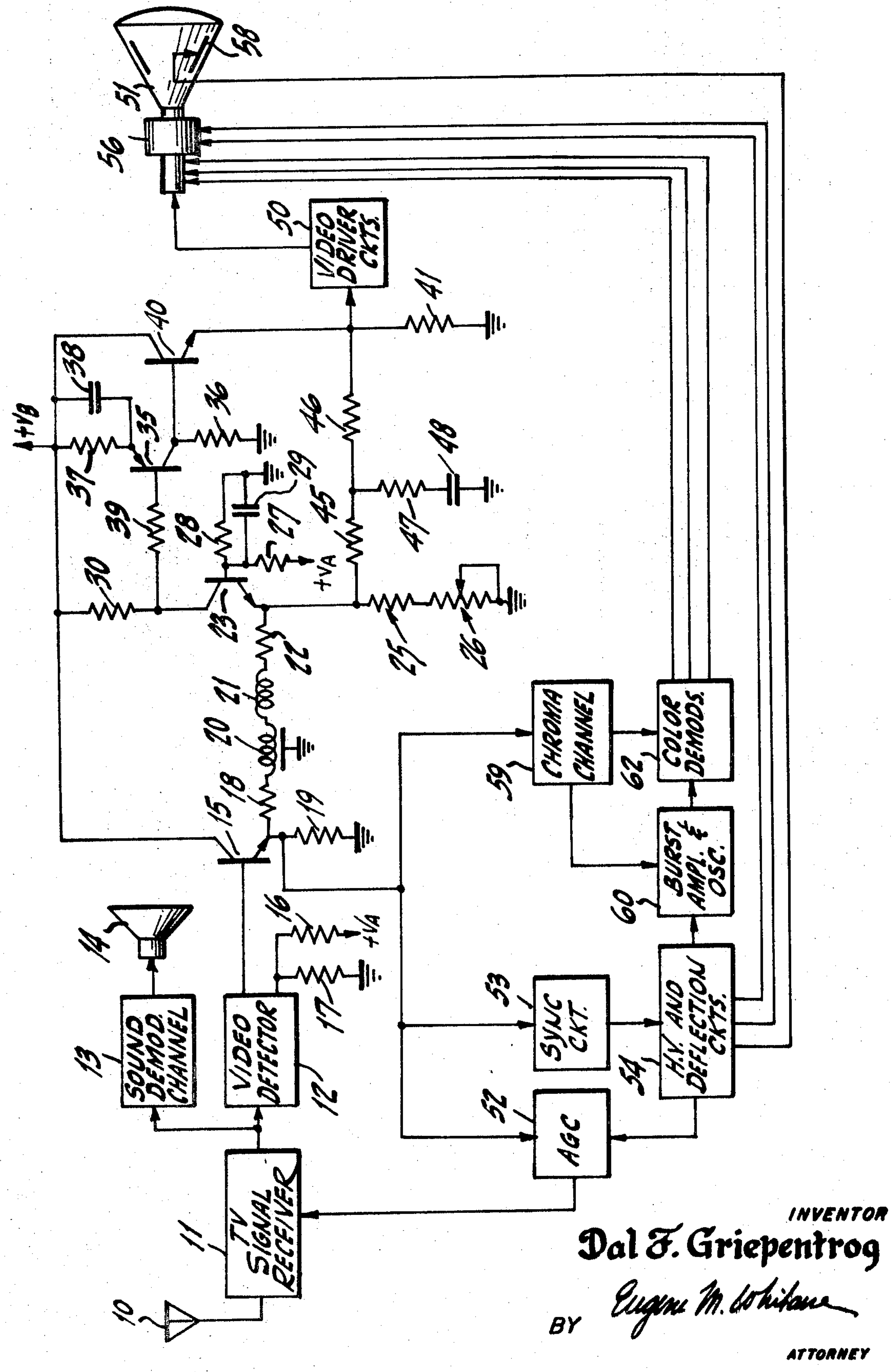
INVENTOR
Dal F. Griepentrog
BY Eugene M. Whitacre
ATTORNEY

VIDEO AMPLIFIER FOR DRIVING A DELAY LINE BETWEEN GROUNDED COLLECTOR AND GROUNDED BASE STAGES

This invention relates to television receivers and more particularly to a transistorized video amplifier for use in a color television receiver.

The function of the luminance channel in a color television receiver is well known. This channel serves to process the luminance signal, corresponding to monochrome information, for application to the appropriate electrodes of the color kinescope. The luminance channel is relatively wide band for accommodating the wide frequency range of such signals and amplifiers employed therein desirably should possess a relatively good high frequency and proper phase response.

In color receivers, a chrominance channel operates on color information which is separately processed for application to the appropriate kinescope electrodes where such information is usually superimposed upon the luminance information. The bandwidth of the chrominance channel is narrower than that of the luminance channel. Therefore to assure that both signals arrive at the kinescope relatively simultaneously, a delay line is incorporated in the wider band luminance channel because of the smaller signal time delay. Delay lines, as presently utilized, are relatively low impedance devices and desirably should be matched or properly terminated at their input and output to avoid reflections or reactive feedback, which may otherwise disturb the kinescope display quality.

In transistorized color receivers, there is a desire to use economical components and yet achieve reliable, good quality operation in the luminance channel. Therefore, the amplifiers in the luminance channel desirably should be capable of driving the delay line with proper impedance terminations, and also should be capable of operating reliably for varying device characteristics.

It is an object of the present invention to provide an improved transistorized video amplifier, suitable for supplying the drive requirements of a luminance output stage of a color television receiver and employing apparatus providing a relatively linear frequency response and reliable terminations for a delay line incorporated therein.

According to an embodiment of this invention, a luminance amplifier channel has a delay line coupled between an emitter electrode or output of a common collector amplifier and the emitter electrode or input of a common base amplifier. This coupling assures that the delay line is properly terminated both at its input and output terminals over the bandwidth of the luminance channel. The collector of the common base amplifier or output is coupled to the base of an opposite conductivity common emitter amplifier for providing luminance gain and phase inversion. The output of the common emitter amplifier is coupled to the base of a second emitter follower. A feedback arrangement couples the output or emitter electrode of the second emitter follower to the input or emitter of the common base amplifier to provide feedback for linearizing the overall amplifier performance and further stabilizing circuit operation. This feedback arrangement also contains a peaking network for improvement of the overall high frequency response of the amplifier, without the necessity of individually peaking each stage.

A clearer understanding of the present invention will be conveyed if reference is made to the specification and the FIGURE which is a schematic circuit diagram of a television receiver employing a luminance amplifier according to this invention.

Referring to the FIGURE an antenna 10 receives radio frequency television signals. A television signal receiver 11 coupled to the antenna 10 serves to further process these signals by converting the radio frequency signals to intermediate frequency or IF signals by means of conventional and known techniques. Such techniques may employ a mixer and a local oscillator and suitable stages of amplification to obtain the television intermediate frequency. A video detector 12 has its input coupled to the output of the television signal receiver 11 and contains a diode circuit arranged in a detector configuration, which is responsive to the IF signals to derive therefrom a composite television signal. A sound demodulation channel 13 is also coupled to the output of the television signal receiver and serves to detect the frequency modulated sound carrier and side bands thereof to provide a signal representative of the audio transmitted for application to a speaker 14.

An output of the video detector 12 is coupled to the base electrode of a transistor 15 arranged in a common collector or emitter follower configuration. A voltage divider comprising resistors 16 and 17 is coupled between a reference voltage designated as $+V_a$ and a point of reference potential such as ground. The junction formed by resistors 16 and 17 is shown coupled to an input of the video detector 12 for biasing or referencing said detector to a selected DC level. This bias also serves to bias the base electrode of transistor 15. The emitter electrode of transistor 15 is coupled to ground through a resistor 19; while the collector electrode is returned to a source of potential designated as $+V_b$. The emitter electrode of transistor 15 presents a low impedance driving source and as such is coupled to one terminal of a series network comprising resistor 18, delay line 20, inductor 21 and resistor 22 respectively. The other terminal of this series network evidenced by a terminal of resistor 22, is coupled to the emitter electrode of transistor 23 arranged in a common base configuration. The emitter electrode of transistor 23 is returned to ground through the series combination of resistors 25 and variable resistor 26. Transistor 23 is biased by means of a voltage divider comprising resistors 27 and 28 coupled between the potential source $+V_a$ and ground and having the junction coupled to the base of transistor 23. Bypass capacitor 29 effectively grounds the base of transistor 23 for signal frequencies. The collector of transistor 23 is coupled through a resistor 30 to the source of potential $+V_b$.

A transistor 35 in a common emitter configuration has its collector electrode coupled to a point of reference potential through a resistor 36; the emitter electrode of transistor 35 is coupled through a resistor 37 to the $+V_b$ source and is bypassed by a capacitor 38. Drive and bias for transistor 35 is supplied via resistor 39 coupled between the collector electrode of transistor 23 and the base electrode of transistor 35.

A further transistor 40 is arranged in a common collector configuration having the collector electrode returned to $+V_b$ and the emitter electrode of transistor 40 referenced to ground through a resistor 41. Bias and drive for transistor 40 is obtained by coupling the base electrode thereof to the collector electrode of transistor 35. A feedback network comprising the series connection of resistors 45 and 46 is coupled between the emitter electrode of transistor 40 and the emitter electrode of transistor 23. The junction between the resistors 45 and 46 is returned to ground through a series path comprising resistor 47 and capacitor 48. In this manner negative feedback is afforded to the overall amplifier configuration comprising transistors 23, 35 and 40. The luminance amplifier just described, having a final output represented by the emitter electrode of transistor 40, supplies video signals to the input of a video driver circuit 50 utilized to supply relatively large amplitude luminance signals to the appropriate electrodes, such as the cathodes, of a color kinescope 51, which may, for example, be a three-gun shadow mask device.

The video driver circuit 50 may typically comprise an NPN silicon power transistor, having high interelectrode voltage breakdown ratings appropriate to a peak-to-peak voltage swing at the collector electrode suitable for application to the cathode electrodes of the color kinescope. Such swings may be of the order of magnitude of 200 or more volts. Accordingly, the base current drive requirement for properly operating the driver circuit 50 is relatively high, and the source impedance presented to the base electrode of the power transistor desirably should be quite low. Due to such requirements, the output impedance of transistor 40 should be as low as possible.

Also present in a color television receiver is an AGC circuit 52, a sync circuit 53 and a chroma channel 59. The inputs to these circuits are supplied by the low impedance output at the emitter electrode of transistor 15. In a manner known in the art, the AGC circuit 52 functions to monitor the amplitude of the video signal present at the emitter electrode of transistor 15 to develop a control voltage proportional to this amplitude to effect gain control of the RF and IF stages of amplification present in the television signal receiver 11. To further assure relatively noise immune operation, the AGC circuit 52, may, for example, be of the keyed type and hence is shown having an input coupled to the high voltage and deflection circuits 54 for providing a gating pulse to the AGC 52.

The function of the sync circuit 53 is to operate on the composite video signal present at its input to "strip " the synchronizing component therefrom, necessary to assure proper representation of the television display. The synchronizing circuit 53 in turn supplies an output to the input of the high voltage and deflection circuits 54.

The high voltage and deflection circuits 54 serve to generate synchronized horizontal and vertical driving waveshapes for deflecting the electron beams of the color kinescope 51 which action is necessary to provide a raster. In this manner two outputs from the high voltage and deflection circuits 54 are shown coupled to a yoke 56 associated with the kine 51 for deflecting said electron beams both horizontally and vertically under the control of the waveforms generated in block 54 and energizing yoke 56. In most conventional receivers the high voltage necessary to operate the kinescope 51 is also generated by the rectification of appropriate pulses produced by the action of the deflection circuits 54. For this purpose, a further output is shown from the high voltage and deflection circuits 54 coupled to the ultor electrode or second anode 58 of the kinescope 51, which output supplies high voltage thereto.

The function of the chroma channel 59 is to retrieve and process the color information present in the composite signal within the bandwidth associated with such information. An output of the chroma channel 59 is coupled to an input of a burst amplifier and oscillator 60 having another input supplied by the high voltage and deflection circuits 54. The function of the burst amplifier portion of block 60 is to retrieve and amplify color bursts which are present in the composite signal at the back porch of the horizontal synchronizing pulses. A pulse supplied by the high voltage and deflection circuits 54 is used to gate the burst amplifier, having another input from the chrominance channel 59, during the time when bursts are present. These bursts are then used to synchronize a color oscillator, included within block 60, operating at the color subcarrier frequency. The output of this oscillator is utilized as an input to color demodulators 62 which have another input derived from an output of the chroma channel 59. The function of the color demodulators 62 is to synchronously demodulate the chrominance information using respective appropriately phased outputs of the reference oscillator as a standard. In this manner color difference signals are provided at the outputs of the color demodulators for coupling to the appropriate electrodes of the three-gun shadow mask tube 51.

Operation of the luminance amplifier circuit which embodies the present invention will be described in greater detail. Video signals provided by detector 12 are coupled to the base of emitter follower 15 which provides a high impedance to the detector to avoid loading the detector and adversely affecting such video signals. The output or emitter circuit of transistor, 15 in the emitter follower configuration, although providing no voltage gain gives a high current gain and a relatively low output impedance. The current drive capabilities of this stage are then utilized to drive the AGC, sync, and chroma channels while further providing a low output impedance for coupling to the input of the delay line 20. The resistor 18 coupled between the emitter electrode of transistor 15 and an input terminal of delay line 20 is selected to approximately match the characteristic input impedance of the delay line 20. This is feasible as the output impedance at the emitter of transistor 15 over the luminance frequency range of a considerably smaller magnitude then the input impedance of the delay line 20.

The output terminal of the delay line 20 is coupled through a peaking coil 21 and a second resistor 22 to the emitter electrode of transistor 23. Transistor 23, arranged in a common base configuration, presents an even lower impedance at its emitter electrode input than that impedance at the emitter electrode of transistor 15. Accordingly, resistor 22 may also be selected to substantially correspond in magnitude to the characteristic impedance of delay line 20. Hence, the delay line 20 is terminated throughout the entire band of luminance frequencies in its characteristic impedance both at the input and output terminals thereof. The terminating impedances at both ends are reliably determined by the resistors 18 and 22, and little affected by variations in the contrastingly small transistor impedance. By utilizing the termination as described above, the delay line behaves throughout the luminance band as a substantially pure delay line in that reflections are virtually nonexistent and reactive feedback is substantially reduced or minimized. This aspect is important when utilizing transistors in luminance amplifiers because of the notorious spread in transistor characteristics, both on a device-to-device basis, and on a frequency basis as well.

The delayed video signal coupled to the emitter of transistor 23 is amplified by the common base configuration which has a relatively high voltage gain without phase inversion. However, due to the ratios of its input and output impedances the current gain of the common base stage is relatively low. To afford proper luminance signal inversion and high signal voltage gain the collector electrode of the common base amplifier is coupled to the base electrode of the common emitter amplifier employing transistor 25. The common emitter configuration provides a high power gain to the luminance signal and serves to invert the polarity of the signal in a manner suitable for eventual coupling to the kinescope 51. To provide further isolation and a low driving source necessary to operate the video driver circuit 50 the collector of transistor 35 is coupled to the base of emitter follower 40. The low impedance output of emitter follower 40 is used to drive the video circuit 50.

With the exception of the high frequency bypass capacitor 38 appearing across the emitter bias resistor 37 associated with transistor 35 there is no high frequency compensation present in the video amplifier stage as thus described. High frequency compensation together with negative feedback assures stable operating characteristics and wide band response and is accomplished by the feedback arrangement comprising resistors 45, 46, and 47 and capacitor 48 arranged in a "tee" configuration coupled between the emitter electrode of transistor 40 and that of transistor 23. Resistor or nonselective feedback is accomplished throughout the luminance frequency band by the series resistors 45 and 46. The polarity of this feedback is negative as the signal fed back to the emitter of transistor 23 is 180 degrees out-of-phase with the signal coupled through the delay line 20. The amount of feedback is substantially constant for the lower and medium frequency components of the luminance signal, the feedback thus assuring stable gain operation with respect to varying transistor parameters. better temperature performance and an increase in bandwidth proportional to the decrease in gain above the open loop condition. These characteristics of negative feedback in amplifiers are commonly known. The feedback serves to further reduce the effective output impedance seen at the emitter electrode of transistor 40 which, as described above, is desirable.

To improve the high frequency response of the video amplifier, the combination of resistor 47 and capacitor 48, coupled between the junction of resistors 45 and 46 and a point of reference potential, such as ground, affords selective peaking for the higher luminance frequencies in the following manner. The value of resistor 47 and capacitor 48 are chosen such that for lower luminance frequencies the capacitive reactance is high. Thus feedback at these points is essentially determined by the magnitude of resistors 45 and 46 as previously described. As the frequency increases the magnitude of the reactance of capacitor 45 decreases which effectively tends to place less impedance to ground at the aforementioned junction point. Hence for these conditions, the feedback signal coupled to the emitter of transistor 23 is attenuated according to the magnitude of the impedance of resistor 47 and capacitor 48 compared to the magnitude of resistor 46. This attenuation causes less signal to be coupled to the emitter electrode or input of transistor 23, resulting in less negative feedback, which in turn results in a higher gain for these high frequencies. The resulting increase in gain is sufficient to provide better definition in terms of the final video display. Other frequency selective networks could be employed in place of resistor 47 and capacitor 48 to produce similar results.

A further advantage of the above-described circuit is the location of the brightness control 26 located in the emitter return path for transistor 23. Variations of potentiometer 26 changes the effective direct current level at the collector of transistor 23 and therefore the DC coupled to the final luminance or video driver circuit 50. Concurrently because of the relative isolation afforded by resistor 45, variations of the impedance of the brightness control 26 does not serve to substantially affect the peaking circuit. In this manner while the amplifier bias has been changed the frequency response including the point at which peaking occurs remains relatively constant assuring good quality or a well defined picture over the normal range of brightness. A circuit using the above-described invention for a luminance amplifier uses the following components:

| | |
|---|---|
| Resistor **16** | 2190 ohms |
| Resistor **17** | 390 ohms |
| Resistor **18** | 620 ohms |
| Resistor **19** | 1000 ohms |
| Resistor **22** | 680 ohms |
| Resistor **25** | 470 ohms |
| Resistor **26** | 20,000 ohms (Variable) |
| Resistor **27** | 1,800 ohms |
| Resistor **28** | 680 ohms |
| Resistor **30** | 330 ohms |
| Resistor **36** | 1,800 ohms |
| Resistor **37** | 27 ohms |
| Resistor **41** | 1,800 ohms |
| Resistor **45** | 3,900 ohms |
| Resistor **46** | 4,700 ohms |
| Inductor **21** | 15 micromicrohenries |
| Capacitor **29** | 10 microfarads |
| Capacitor **38** | .0027 microfarads |
| Capacitor **48** | 47 micromicrofarads |
| Delay line **20** | 680 ohms characteristic impedance |
| Transistor **15** | SE1002 |
| Transistor **23** | 2N3694 |
| Transistor **35** | 2N4121 |
| Transistor **40** | 2N3643 |
| $+V_b$ | 30 volts DC |
| $+V_a$ | 15 volts DC regulated |

I claim:

1. A luminance amplifier for a color television receiver comprising:

a. a first transistor, having a base, collector and emitter electrode, said transistor arranged in a common collector configuration, b. a source of composite video signals coupled to said base electrode, c. a second transistor having a base, collector and emitter electrode, said second transistor arranged in a common base configuration, d. a delay line having input and output terminals and a specified characteristic impedance, e. means including a first and a second resistor each of a magnitude substantially equal to said specified characteristic impedance said first resistor coupling said input terminal of said delay line to said emitter electrode of said first transistor and said second resistor coupling said emitter electrode of said second transistor to said output terminal of said delay line to terminate said delay line at said terminals with said specified characteristic impedance for substantially all frequencies within said composite signal, f. a chrominance channel for responding to and processing chrominance components contained in said composite signal, and g. means coupling said emitter electrode of said first transistor to said chrominance channel to apply said composite signal thereto whereby said terminated delay line prevents undesired reflections from interfering with the operation of said chrominance channel.

2. A video amplifier for use in a color television receiver comprising:

a. a source of composite television signals, b. a first transistor arranged in a common collector configuration having an input coupled to said source responsive to said composite television signal, and having a low impedance emitter electrode output circuit, c. a delay line having an input and output terminal and having a given characteristic impedance, d. a second transistor arranged in a common base configuration having a low impedance emitter electrode input circuit and a high impedance collector electrode output circuit, e. a third transistor arranged in a common emitter configuration having an input base electrode circuit coupled to said high impedance collector electrode output circuit of said second transistor, said third transistor having a collector circuit for providing an inverted polarity composite television signal when compared to a signal on said base electrode, f. a fourth transistor in a common collector configuration having a high impedance base electrode circuit coupled to said collector circuit of said third transistor, and having a low impedance emitter output circuit, g. means including a first resistor coupling one terminal of said delay line to said output circuit of said first transistor amplifier and a second resistor coupling said other terminal of said delay line to said input circuit of said second transistor amplifier, said resistors selected of a magnitude substantially equal to said characteristic impedance of said delay line to terminate said delay line for the frequency band of said composite signals, h. a feedback circuit coupled between the input of said second transistor amplifier and said output of said fourth transistor for providing negative feedback to said video amplifier over said frequency band of said composite television signals, for stabilizing said video amplifier operation, i. a chrominance channel for responding to and processing chrominance components contained in said composite signal, and j. means coupling said emitter electrode of said first transistor to said chrominance channel to apply said composite signal thereto whereby said terminated delay line prevents undesired reflections from interfering with the operation of said chrominance channel.

3. The video amplifier according to claim 2 wherein said feedback circuit comprises:

a. first and second resistors connected in series between said input of said second transistor and said output of said fourth transistor.

4. The video amplifier according to claim 3 wherein said feedback circuit further comprises:

a. a frequency selective circuit coupled between the junction of said first and second resistors and a point of reference potential for reducing said negative feedback for higher frequency components of said composite signal.

5. The video amplifier according to claim 2 wherein said feedback circuit comprises:

a. a "tee" network including two series resistors coupled between said input of said second transistor and said output of said fourth transistor, the junction of said resistors coupled to a point of reference potential through a frequency selective feedback network operative to reduce said negative feedback for higher frequency components of said composite signal.

6. The amplifier according to claim 2 further comprising:

a. a variable resistor coupled between said input to said second transistor and a point of reference potential for varying the DC level at said output of said second transistor and therefore the DC level of said composite video signal amplified thereby.

7. A video amplifier for use in the luminance channel of a color television receiver, comprising:

a. first means for providing a composite television signal, b. a first common collector amplifier stage having a low output impedance emitter circuit, and an input coupled to said first means, c. a common base amplifier stage having a low input impedance emitter circuit and an output terminal, d. a delay line having first and second terminals and a given predetermined characteristic impedance, e. first and second resistors, said first resistor being coupled between one terminal of said delay line and said low output impedance emitter circuit of said common collector amplifier, said second resistor being coupled between said other terminal of said delay line and the low input impedance emitter circuit of said common base amplifier, said magnitude of said resistors being substantially equal to said characteristic impedance to terminate said delay line over the range of frequencies contained in said composite television signal, f. a common emitter amplifier stage having an input coupled to said output terminal of said common base amplifier stage, for inverting the polarity of said composite television signal at an output thereof, g. a second common collector amplifier stage having a low output impedance emitter circuit and an input coupled to said output of said common emitter amplifier stage, h. a feedback circuit coupled between the emitter circuits of said common base amplifier and said second common collector amplifier for stabilizing the operating characteristics of said video amplifier over said range of frequencies present in said composite television signals, i. a chrominance channel for responding to and processing chrominance components contained in said composite signal, and j. means coupling said emitter circuit of said common collector amplifier stage to said chrominance channel to apply said composite signal thereto, whereby said terminated delay line prevents undesired reflections from interfering with the operation of said chrominance channel.

8. A video amplifier for use in a color television receiver, comprising:

a. a source of composite television signals, b. a delay line having a specified characteristic impedance, and having a first and a second terminal, c. a first transistor arranged in a common collector configuration having an input coupled to said source of composite television signals, and having an emitter electrode output impedance of a magnitude substantially less than said specified characteristic impedance, d. a second transistor arranged in common base configuration and having an emitter electrode input impedance of a magnitude substantially less than said specified characteristic impedance and less than said emitter output impedance of said first transistor, e. a first resistor of a magnitude substantially equal to said characteristic impedance having end terminals, one of said end terminals being coupled to said emitter electrode of said first transistor, and the other of said end terminals being coupled to said first terminal of said delay line, f. a second resistor also of a magnitude substantially equal to said characteristic impedance having end terminals, one of said end terminals being coupled to said emitter electrode of said second transistor and the other of said end terminals being coupled to said second terminal of said delay line whereby said delay line is reliably terminated at both said input and output ends in an impedance substantially matching said characteristic impedance, g. a chrominance channel for responding to and processing chrominance components contained in said composite signal, and h. means coupling said emitter electrode of said first transistor to said chrominance channel to apply said composite signal thereto whereby said terminated delay line prevents undesired reflections from interfering with the operation of said chrominance channel.

9. A video amplifier for use in a color television receiver, comprising:

a. means for providing a composite television signal, b. a delay line having a specified characteristic impedance, c. a first transistor amplifier arranged in a common collector configuration, having an input coupled to said composite television signal providing means, and having an emitter output circuit of an impedance magnitude significantly less than said specified characteristic impedance, d. a second transistor amplifier arranged in a common base configuration having an emitter input circuit of an impedance magnitude significantly less than said specified characteristic impedance and less than said impedance of said emitter output circuit of said first transistor, and e. means, including a first resistor of a magnitude substantially equal to said specified characteristic impedance coupling said output circuit to one end of said delay line, and a second resistor also of a magnitude substantially equal to said characteristic impedance coupling the other end of said delay line to said second transistor amplifier input circuit, for providing terminations for said delay line which remain substantially equal to said characteristic impedance over the frequency band of said composite television signals, and which are relatively independent of impedance variations exhibited by the transistors of said amplifiers, f. a chrominance channel for responding to and processing chrominance components contained in said composite signal, g. means coupling said emitter output circuit of said first transistor to said chrominance channel to apply said composite signal thereto whereby said delay line with terminations prevents undesired reflections from interfering with the operation of said chrominance channel.

10. In a color television receiver including a color image reproducing device; and an output amplifier stage for driving said reproducing device, said output amplifier stage employing a semiconductor amplifying device exhibiting a relatively low input impedance at an input terminal thereof, and requiring relatively large luminance signal input current variations of a predetermined polarity in order to drive said reproducing device with luminance signals of adequate amplitude and correct polarity;

a luminance signal amplifying channel, responsive to the output of said source, for supplying to said input terminal a polarity inverted version of said luminance signals that accords with the input requirements of said output amplifier stage comprising, in combination:

a video detector for developing a luminance signal output of a first polarity;

a delay line having a predetermined characteristic impedance;

an emitter follower amplifier having an input circuit responsive to the luminance signal output of said detector, and having an output circuit, the output impedance of said emitter follower amplifier being appreciably lower than said characteristic impedance of said delay line;

means including a first resistor, having a resistance value substantially equal to said characteristic impedance, for coupling said emitter follower output circuit to the input of said delay line;

a common base transistor amplifier having an emitter input electrode, and a collector output electrode;

means including a second resistor, having a resistance value substantially equal to said characteristic impedance, for coupling the output of said delay line to the emitter electrode of said common base amplifier;

a transistor amplifier of common emitter configuration having an input electrode and an output electrode;

means for coupling said collector electrode of said common base amplifier to said input electrode to provide at said output electrode amplified luminance signals of said predetermined polarity;

a transistor amplifier of common collector configuration having a base input circuit coupled to said output electrode of said common emitter amplifier and an emitter output circuit coupled to said input terminal;

means for dynamically reducing the source impedance presented by said channel to said input terminal, said last-named means comprising means for establishing a negative feedback path between said emitter output circuit of said common collector amplifier and said emitter electrode of said common base amplifier;

a chrominance channel for responding to and processing chrominance components contained in said composite signal, and means coupling said output circuit of said emitter follower amplifier to said chrominance channel to apply said composite signal thereto, whereby said terminated delay line prevents undesired reflections from interfering with the operation of said chrominance channel.

11. Apparatus in accordance with claim 10 wherein said negative feedback path includes a resistive coupling between said emitter output circuit of said common collector amplifier and said emitter electrode of said common base amplifier.